United States Patent [19]

Kondou et al.

[11] Patent Number: 5,380,686

[45] Date of Patent: Jan. 10, 1995

[54] PROCESS FOR PRODUCING COMPOSITE RAW MATERIAL FOR CERAMICS AND COMPOSITE RAW MATERIAL FOR CERAMICS PRODUCED BY SAID PROCESS

[75] Inventors: Isao Kondou, Ikeda; Nobuyuki Tamari, Toyonaka; Takahiro Tanaka; Satoshi Sodeoka, both of Ikeda, all of Japan

[73] Assignee: Agency of Industrial Science & Technology, Tokyo, Japan

[21] Appl. No.: 109,058

[22] Filed: Aug. 19, 1993

[30] Foreign Application Priority Data

Sep. 11, 1992 [JP] Japan .................. 4-269422

[51] Int. Cl.$^6$ .................. C04B 35/56; C04B 35/10
[52] U.S. Cl. .................. 501/87; 501/88; 501/89; 501/98; 501/100; 501/153
[58] Field of Search .................. 501/87, 88, 89, 98, 501/100, 153

[56] References Cited

U.S. PATENT DOCUMENTS

| | | | |
|---|---|---|---|
| 2,849,305 | 8/1958 | Frost | 501/87 |
| 3,965,042 | 6/1976 | Feldwick et al. | |
| 4,028,123 | 6/1977 | Greenwald | 501/89 |
| 4,816,428 | 3/1989 | Kishi et al. | 501/98 X |
| 4,944,991 | 6/1990 | Karas et al. | 428/408 |
| 5,009,822 | 4/1991 | Sacks et al. | 501/88 X |

FOREIGN PATENT DOCUMENTS 0081064  5/1985  Japan .................. 501/89

*Primary Examiner*—Mark L. Bell
*Assistant Examiner*—David Sample
*Attorney, Agent, or Firm*—Armstrong, Westerman, Hattori, McLeland & Naughton

[57] ABSTRACT

There are disclosed a process for producing a uniformly mixed composite raw material for ceramics by recovering the uniformly mixed composite raw material for ceramics from the dispersion of at least two types of raw materials for ceramics and optionally a component other than said materials in a liquid medium, which comprises coagulating and precipitating the composite raw material together with aluminum hydroxide formed by reacting an aluminum salt with an alkali in the liquid medium; and a uniformly mixed composite raw material for ceramics which is produced by the above process.

4 Claims, No Drawings

PROCESS FOR PRODUCING COMPOSITE RAW MATERIAL FOR CERAMICS AND COMPOSITE RAW MATERIAL FOR CERAMICS PRODUCED BY SAID PROCESS

BACKGROUND OF THE INVENTION

1. Field of the Invention

The present invention relates to a process for producing a composite raw material for ceramics which is uniformly mixed and useful as the raw material for the production of a composite material for ceramics and to a composite raw material for ceramics which is produced by the above-mentioned process.

2. Description of the Prior Art

A composite material for ceramics which comprises at least two types of raw material components uniformly mixed with each other is produced by firing a composite raw material for ceramics which is prepared by mixing at least two raw materials for ceramics.

The ball mill process for producing a composite raw material for ceramics comprises dispersing at least two types of raw materials to be mixed in a liquid medium in a pot to form a slurry and mixing the raw materials in the slurry form together with grinding balls is widely employed because of its simplicity and convenience.

In the usual ball mill process, solid matters are separated by filtration or other means from the slurry in which the raw materials are dispersed and compounded to recover the composite raw material. In the aforesaid process, however, when there is considerable difference between the raw materials to be used in terms of density, particle size, shape, etc., it brings about a difference in the dispersion characteristics and/or sedimentation velocity of the particles in the liquid medium and thus the problem that the raw material components that have once been well mixed are reseparated during the operation of separation or recovery, thereby making it difficult to produce uniformly mixed composite raw material.

In order to solve the above-mentioned problem, there have been developed a spray drying method in which the slurry containing raw material components dispersed and mixed therein is spray dried to recover the composite raw material, a method for recovering the composite raw materials by drying the slurry with a fluidized dryer and like methods. The aforesaid methods, however, suffer from the disadvantage in that the yield of the composite raw materials and thermal efficiency are low; and besides the equipment to be used in these methods is expensive, thus causing practical problems. Such an obstacle in the technological development on the production of composite raw materials is one of the contributors to the obstruction to the development of composite ceramics materials and industrial utilization thereof.

Surprisingly, it has been found that when aluminum hydroxide is precipitated in the slurry in which at least two types of raw material components are present in uniformly dispersed and mixed state, these components coagulate and precipitate together with the precipitate of aluminum hydroxide, while retaining the uniformly mixed state.

SUMMARY OF THE INVENTION

Thus the present invention relates to a process for producing a uniformly mixed composite raw material for ceramics by recovering them from the dispersion of at least two types of raw materials for ceramics in a liquid medium, which comprises coagulating and precipitating said composite raw material together with aluminum hydroxide precipitate formed by reacting an aluminum salt with an alkali in said medium.

In addition, the present invention relates to a process for producing a uniformly mixed composite raw material for ceramics, wherein the formation of said aluminum hydroxide precipitate is effected after the formation of the dispersion of said at least two types of raw materials for ceramics.

Moreover, the present invention relates to a process for producing a uniformly mixed composite raw material for ceramics, wherein the formation of said aluminum hydroxide precipitate is effected prior to the formation of the dispersion of said at least two types of raw materials for ceramics.

In the process of the present invention, additional substances other than the raw material for ceramics may also be precipitated together with the aluminum hydroxide precipitate from said liquid medium.

Furthermore, the present invention relates to a composite raw material for ceramics which is uniformly mixed and which is produced by any of the above-mentioned processes.

DESCRIPTION OF THE PREFERRED EMBODIMENTS

The process according to the present invention is characterized in that the raw material for ceramics dispersed in the liquid medium is recovered by coagulating and precipitating the same together with the aluminum hydroxide precipitate formed in situ.

Aluminum hydroxide produced by reacting an aluminum salt with an alkali in a liquid medium is characterized by its formation of an extremely bulky precipitate. Paying attention to this characteristic, the present inventors have found that the uniformly mixed composite raw material for ceramics can be obtained by coagulating and precipitating said raw material in the uniformly mixed state together with the precipitate of aluminum hydroxide formed therein.

In the process according to the present invention, the order of dispersing and mixing step of the raw materials and the step of forming the aluminum hydroxide precipitate is not specifically defined, and these steps may be carried out simultaneously, or one after another in an arbitrary order. At any rate, it is desirable that the dispersion, i.e., the slurry, be stirred to maintain the dispersed state therein until the formation of the aluminum hydroxide precipitate is complete and thereafter, the slurry be allowed to stand to precipitate solid matters. It is advantageous to disperse in the liquid medium a plurality of raw materials for ceramics together with an aluminum salt, and thereafter add an alkali to the slurry under sufficient stirring.

When other solid matter is also present and dispersed in the liquid medium, it becomes precipitated together with aluminum hydroxide precipitate. Therefore, other solid matter may intentionally be incorporated into the dispersion.

Each of raw materials for ceramics used in the present invention may be in any form such as powders, granules or whiskers, among which powders or whiskers are preferred. The suitable raw materials include those having different constitution from each other, or those having the same constitution but of different shapes.

In order to obtain a more uniform composite raw material, the powdery raw materials preferably have a maximum particle diameter of 5 $\mu$m or less, desirably 2 $\mu$m or less, and an average particle diameter of 2 $\mu$m or less, desirably 1 $\mu$m or less, more desirably 0.5 $\mu$m or less, and whiskery raw materials have an average diameter of 2 $\mu$m or less preferably 1 $\mu$m or less, and a length of 150 $\mu$m or less, desirably 50 $\mu$m or less.

The process according to the present invention is particularly effective in the case of using raw materials formed by the combination of powders and whiskers, or raw materials having a considerable difference in density of the respective components, for example, those having a ratio of the maximum density to the minimum density of 1.5 or more, especially 2.0 or more. In any of the above cases, it is particularly difficult to obtain a uniformly mixed composite raw material by a process other than the present invention. The process of the present invention is also advantageous when an oxide-based raw material powder and a non-oxide-based raw material powder are used together.

Examples of the raw materials for ceramics that are suitable for the process according to the present invention include alumina, zirconia, silica, magnesia, hafnium oxide, rare earth element oxides, mullite, hydroxy apatite, calcium phosphate, silicon nitride, aluminum nitride, titanium nitride, sialon, silicon carbide, titanium carbide, tungsten carbide, boron carbide, titanium boride, graphite, and the like. Any of the above-mentioned materials may be used in any appropriate combination with other material.

A suitable liquid medium for the process of the present invention is usually an aqueous solvent. In addition, depending on the type of the aluminum salt, other solvents such as an alcohol or acetone may also be used. The amount of the liquid medium used in the process of the present invention is not particularly limited, but may be properly selected by taking into consideration of the characteristics of the dispersion, i.e., the slurry to be formed, simplicity and convenience in each step, energy efficiency and the like. As a general rule, a larger amount is desirable from the viewpoint of uniformity of the slurry to be produced, but a smaller amount is desirable from the viewpoint of recovery efficiency of the composite raw material.

Examples of the aluminum salts suitable for the formation of aluminum hydroxide include water-soluble aluminum salts such as aluminum nitrate, aluminum chloride and aluminum acetate, among which aluminum nitrate and aluminum chloride are preferred because they are easily decomposed during firing for the production of the composite material for ceramics, even if a certain amount of them may remain in the recovered composite raw material. Likewise, examples of the alkali include hydroxides of alkali metals such as sodium hydroxide and potassium hydroxide; carbonates of alkali metals such as sodium carbonate; and ammonia, among which ammonia is preferred for it is easily decomposed. The amounts of the aluminum salt and alkali are not particularly limited, but may be properly selected by taking into consideration of the precipitate formation conditions and the extent of incorporation of aluminum hydroxide into the composite raw material. As a general rule, the amount of the aluminum salt is 5 parts by weight or less, and desirably 3 or less, more desirably 1 or less, and especially 0.05 to 0.5 parts by weight in terms of alumina per 100 parts by weight of the total amount of the raw materials.

In carrying out the process according to the present invention, at least two types of raw materials for ceramics are added to the liquid medium with stirring to disperse and mix the raw materials in the medium and form a slurry. Specifically, ball milling is preferably employed to disperse and mix the raw materials by the action of grinding balls.

At the same time, an aluminum salt is reacted with an alkali in the liquid medium to form aluminum hydroxide, whereupon the raw materials existing in the liquid medium coagulate and precipitate together with the aluminum hydroxide precipitate thus formed. Subsequently, the precipitated solid matters are recovered as the composite raw materials for ceramics by solid-liquid separation means such as filtration and drying. The recovered solid matters containing the composite raw material are contaminated with aluminum hydroxide which, however, is easily converted into alumina during sintering of the composite raw material and therefore generally does not exert an adverse influence on the quality of the product.

In particular, since the grinding balls that are usually used for grinding purpose are made of alumina, the contamination with alumina in a material, and in the raw material for ceramics, is usual. In addition, when an alumina-based material is employed as one of the raw materials, the contamination with alumina brings about no substantial problem.

However, when there arises a problem of contamination with alumina originating from aluminum hydroxide, then the aluminum hydroxide contaminant can easily be removed by washing with an acid solution to dissolve out the aluminum component as ions after recovering the precipitated solid matters. As a result, the amount of alumina contaminant in the composite material for ceramics can be reduced.

The process according to the present invention allows the production of a uniformly mixed composite raw material both easily and inexpensively without using extra equipment by virtue of its capability of uniformly mixing the raw material components. Moreover, the process of the present invention enables to the production of a composite raw material even from two or more types of raw material components having different densities, shapes, particle sizes, etc., which has heretofore been almost impossible by conventional techniques. Furthermore, it is also possible to uniformly mix the raw material components having the same constitution but a different shape or particle size, in a desired proportion and particle distribution.

The present invention will be illustrated in more detail with reference to the following Examples.

EXAMPLE 1

To about 300 ml of distilled water were added 88 g of zirconia powder partially stabilized with yttria (average particle diameter of 0.3 $\mu$m), 12 g of silicon carbide whiskers (average particle diameter of 0.5 $\mu$m and a length of 60 to 100 $\mu$m) and 100 ml of 20 g/l aqueous aluminum nitrate (0.27 g on alumina basis), and the mixture was mixed well with the aid of alumina grinding balls in a ball mill for 8 hours. Then, to the resultant slurry was added 50 ml of 2% aqueous ammonia with vigorous stirring to alkalinize the slurry to pH 9, whereby aluminum hydroxide was formed. Thereafter, the slurry was allowed to stand so as coagulate and precipitate the solid matter dispersed in the slurry. The resultant precipitate was recovered by filtration and dried to afford a uniform, homogeneous and powdery composite raw material.

The composite raw material thus obtained was hot pressed at a temperature of 1500° C. and a pressure of 30 MPa over a period of 30 minutes to sinter the same. Thus, there was obtained a sintered product having a bending strength of 900 MPa in which the whiskers were uniformly dispersed in a zirconia matrix.

COMPARATIVE EXAMPLE 1

The procedure of Example 1 was repeated without using the aqueous aluminum nitrate and ammonia. Specifically, zirconia powder partially stabilized with yttria and silicon carbide whiskers were mixed in a ball mill, and the resultant slurry was allowed to stand in a vessel. As a result, the zirconia powder settled in preference to the whiskers at the bottom of the vessel. A solid matter recovered by filtration was not a satisfactory composite raw material applicable to the production of a composite material for ceramics.

The mixed powder thus obtained was hot pressed in the same manner as that of Example 1 to sinter the same, and the resultant sintered product was observed visually with the result that the whiskers were non-uniformly dispersed in a mottled state. The sintered product had a bending strength of 300 MPa.

EXAMPLE 2

To about 400 ml of distilled water were added 125 g of alumina powder (average particle diameter of 0.2 $\mu$m), 25 g of silicon nitride whiskers (average particle diameter of 1 $\mu$m and a length of 10 to 30 $\mu$m) and 50 ml of 20 g/l aqueous aluminum nitrate (0.14 g, based on alumina), and the mixture was mixed well with the aid of alumina grinding balls in a ball mill for 24 hours. Then, to the resultant slurry was added 50 ml of 2% aqueous ammonia under vigorous stirring to alkalinize the slurry to pH 9, whereby an aluminum hydroxide precipitate was formed. Thereafter, the slurry was allowed to stand so as to coagulate and precipitate the solid matter dispersed in the slurry. The deposited precipitate was recovered by filtration and dried to afford a uniform, homogeneous and powdery composite raw material.

The composite raw material thus obtained was hot pressed at a temperature of 1600° C. and a pressure of 30 MPa over a period of 30 minutes to sinter the same. Thus, there was obtained a sintered product having a bending strength of 610 MPa in which the whiskers were uniformly dispersed in an alumina matrix.

EXAMPLE 3

To about 400 ml of distilled water were added 139 g of hafnium oxide powder (average particle diameter of 0.3 $\mu$m and a density of 10.11 g/cm$^3$), 11 g of silicon carbide whiskers (average particle diameter of 0.5 $\mu$m and a length of 60 to 100 $\mu$m) and 100 ml of 20 g/l aqueous aluminum nitrate and the mixture was mixed with the aid of alumina grinding balls in a ball mill for 8 hours. Then, 50 ml of 2% aqueous ammonia was added to the resultant slurry with vigorous stirring to alkalinize the slurry to pH 9, whereby an aluminum hydroxide precipitate was formed. Thereafter the slurry was allowed to stand to coagulate and precipitate the solid matter dispersed in the slurry. The resultant precipitate was recovered by filtration and dried to afford a uniform, homogeneous and powdery composite raw material.

The composite raw material thus obtained was hot pressed at a temperature of 1600° C. and a pressure of 30 MPa over a period of 30 minutes to sinter the same. Thus, there was obtained a sintered product having a bending strength of 430 MPa in which the whiskers were uniformly dispersed in a hafnium oxide matrix.

COMPARATIVE EXAMPLE 2

The procedure of Example 3 was repeated without using the aqueous aluminum nitrate and aqueous ammonia. Specifically, hafnium oxide powder and silicon carbide whiskers were mixed in a ball mill, and the resultant slurry was allowed to stand in a vessel. The hafnium oxide powder alone rapidly settled in preference to the whiskers at the bottom of the vessel because the density of hafnium oxide is thrice or more as high as that of silicon carbide. Thus it was impossible to obtain a uniform composite raw material.

EXAMPLE 4

To about 400 ml of distilled water were added 88 g of silicon carbide powder (average particle diameter of 0.75 $\mu$m), 10 g of silicon carbide whiskers (average particle diameter of 0.4 $\mu$m and a length of 30 to 60 $\mu$m), 2 g of alumina (average particle diameter of 0.3 $\mu$m) as a sintering aid and 20 ml of 40 g/l aqueous solution of aluminum nitrate, and the mixture was mixed with the aid of alumina grinding balls in a ball mill for 48 hours. Then, 40 ml of 2% aqueous ammonia was added with stirring to the resultant slurry to alkalinize the slurry to pH 9, whereby aluminum hydroxide precipitated. Thereafter the slurry was allowed to stand so as to coagulate and precipitate the solid matter dispersed in the slurry. The resultant precipitate was recovered by filtration and dried to afford a uniform, homogeneous and powdery composite raw material. Since alumina was added to the raw material as a sintering aid to facilitate sintering step, the aluminum hydroxide formed was utilizable as a sintering aid after being converted into alumina upon heating.

The composite raw material thus obtained was hot pressed at a temperature of 2100° C. and a pressure of 40 MPa over a period of 30 minutes to sinter the same. Thus, there was obtained a sintered product having a bending strength of 870 MPa in which the whiskers were uniformly dispersed in a silicon carbide matrix.

EXAMPLE 5

To about 300 ml of distilled water were added 100 ml of 20 g/l aqueous aluminum nitrate and 50 ml of 2% aqueous ammonia to alkalinize the solution to pH 9, whereby aluminum hydroxide precipitate was formed. Then, to the solution containing the aluminum hydroxide precipitate were added 75 g of magnesia powder (average particle diameter of 0.25 $\mu$m) and 45 g of silicon carbide powder (average particle diameter of 0.32 $\mu$m), and the mixture was mixed well with the aid of alumina grinding balls in a ball mill for 24 hours. Then, the resultant slurry was allowed to stand so as to coagulate and precipitate the solid matter dispersed in the slurry. The resultant precipitate was recovered by filtration and dried to afford a uniform, homogeneous and powdery composite raw material.

The composite raw material thus obtained was hot pressed at a temperature of 1850° C. and a pressure of 30 MPa over a period of 30 minutes to sinter the same.

Thus, there was obtained a sintered product having a bending strength of 480 MPa in which the silicon carbide powder was uniformly dispersed in a magnesia matrix.

EXAMPLE 6

To about 300 ml of distilled water were added 105 g of boron carbide powder (average particle diameter of 0.24 μm), 15 g of silicon carbide whiskers (average particle diameter of 1.1 μm and a length of 45 μm) and 100 ml of 20 g/l aqueous aluminum nitrate, and the mixture was mixed well with the aid of alumina grinding balls in a ball mill for 8 hours. Then, 50 ml of 2% aqueous ammonia was added to the resultant slurry with stirring to alkalinize the slurry to pH 9, whereby aluminum hydroxide precipitate was formed. Thereafter the slurry was allowed to stand to coagulate and precipitate the solid matter dispersed in the slurry. The precipitated solid matter was recovered by filtration and dried to afford a uniform, homogeneous and powdery composite raw material.

The composite raw material thus obtained was hot pressed at a temperature of 2100° C. and a pressure of 30 MPa over a period of 30 minutes to sinter the same. Thus, there was obtained a sintered product having a bending strength of 880 MPa in which the whiskers were uniformly dispersed in a boron carbide matrix.

EXAMPLE 7

To about 700 ml of distilled water were added 100 g of calcium phosphate powder (average particle diameter of 0.3 μm), 200 g of zirconia powder (average particle diameter of 0.3 μm) and 100 ml of 40 g/l aqueous aluminum nitrate, and the mixture was mixed with the aid of alumina grinding balls in a ball mill for 8 hours. Then, 100 ml of 2% aqueous ammonia was added to the resultant slurry with stirring to alkalinize the slurry to pH 9 to precipitate aluminum hydroxide. Thereafter the slurry was allowed to stand so as to coagulate and precipitate the solid matter dispersed in the slurry. The precipitated solid matter was recovered by filtration and dried to afford a uniform, homogeneous and powdery composite raw material.

The composite raw material thus obtained was hot pressed at a temperature of 1400° C. and a pressure of 20 MPa over a period of 10 minutes to sinter the same. Thus, there was obtained a sintered product having a bending strength of 440 MPa in which the zirconia powder was uniformly dispersed in a calcium phosphate matrix.

What is claimed is:

1. A process for producing a uniformly mixed composite raw material for ceramics, the process comprising providing a dispersion of at least two types of raw materials for ceramics in a liquid medium, coagulating and precipitating said raw materials together with aluminum hydroxide precipitate formed by reacting an aluminum salt with an alkali in said medium, and recovering said uniformly mixed composite raw material, said aluminum salt being 0.05 to 0.5 parts by weight, in terms of alumina, per 100 parts by weight of the total amount of said raw materials.

2. A process according to claim 1, wherein the formation of said aluminum hydroxide precipitate is effected after the formation of the dispersion of said at least two types of raw materials of ceramics.

3. A process according to claim 1, wherein the formation of said aluminum hydroxide precipitate is effected prior to the formation of the dispersion of said at least two types of raw materials for ceramics.

4. A uniformly mixed composite raw material for ceramics which is produced by the process of claim 1.

* * * * *